(12) United States Patent
Richards, Jr. et al.

(10) Patent No.: US 7,313,786 B2
(45) Date of Patent: Dec. 25, 2007

(54) GRID-ENABLED ANT COMPATIBLE WITH BOTH STAND-ALONE AND GRID-BASED COMPUTING SYSTEMS

(75) Inventors: Patrick J. Richards, Jr., Marietta, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 10/723,470

(22) Filed: Nov. 26, 2003

(65) Prior Publication Data

US 2005/0114834 A1 May 26, 2005

(51) Int. Cl.
*G06F 9/44* (2006.01)
*G06F 9/45* (2006.01)
(52) U.S. Cl. .................. 717/149; 717/115; 717/159
(58) Field of Classification Search ............ None
See application file for complete search history.

(56) References Cited

U.S. PATENT DOCUMENTS

| | | | |
|---|---|---|---|
| 7,093,004 B2 * | 8/2006 | Bernardin et al. | 709/219 |
| 2003/0043815 A1 * | 3/2003 | Tinsley et al. | 370/395.21 |
| 2004/0068554 A1 * | 4/2004 | Bales et al. | 709/218 |
| 2005/0044301 A1 * | 2/2005 | Vasilevsky et al. | 711/1 |
| 2005/0120160 A1 * | 6/2005 | Plouffe et al. | 711/1 |
| 2005/0256971 A1 * | 11/2005 | Colrain et al. | 709/238 |

OTHER PUBLICATIONS

Deelman, Ewa et al., "Grid-Based Galaxy Morphology Analysis for theNational Virtual Observatory", p. 1-20, Proceedings of the ACM/IEEE SC2003 Conference, retrieved Dec. 20, 2006.*

Di Martino, Vincenzo; Mililotti, Marco; "Scheduling in a Grid computing environment using Genetic Algorithms", 2002 IEEE, retrieved Dec. 20, 2006.*

Sandholm, Thomas; Gawor, Jarek; "Grid Services Development Framework Design", May 17, 2002, retrieved using www.scholar.google.com on Dec. 20, 2006.*

Xu, Zhihong; Hou, Xiangdan; Sun, Jizhou; "Ant Algorithm-Based Task Scheduling in Grid Computing", p. 11-7-1110, 2003 IEEE, retrieved Dec. 20, 2006.*

"GSFL: A Workflow Framework for Grid Services," Krishnan et al., Argonne National Laboratory, Preprint, pp. 1-13 (publication date unknown).

"Necessity is the mother of invention: a simple grid computing system using commodity tools," Myers et al., *J. Parallel and Distributed Computing*, 63, pp. 578-589 (2003).

"GridAnt: A Grid Workflow System," Amin et al., pp. 1-8 (publication date unknown).

"GridAnt—Client Side Grid Workflow Management with Ant," Laszewski et al., pp. 1-14 (2003).

* cited by examiner

*Primary Examiner*—Mary Steelman
(74) *Attorney, Agent, or Firm*—Synnestvedt & Lechner LLP; John R. Pivnichny

(57) ABSTRACT

A grid-enabled ANT system that includes ANT XML task files that can run on both grid-enabled machines or stand-alone computers is disclosed. A network file server is used to store files accessed during the build process, and ANT's standard XML tagging and parameters are used, thus enabling the user to use a standardized format for entering XML information. This grid-enabled ANT is transparent to the user since ANT parses the tasks and automatically sends jobs to the grid, when appropriate, instead of the user deciding which tasks to implement as grid tasks.

14 Claims, 7 Drawing Sheets

```
1   <project name="MyProject" default="dist" basedir=".">
2      <description>
3         simple example build file
4      </description>
5     <!-- set global properties for this build -->
6     <property name="src" location="src"/>
7     <property name="build" location="build"/>
8     <property name="dist"  location="dist"/>
9
10    <target name="init">
11       <!-- Create the time stamp -->
12       <tstamp/>
13       <!-- Create the build directory structure used by compile -->
14       <mkdir dir="${build}"/>
15    </target>
16
17    <target name="compile" depends="init"
18          description="compile the source " >
19       <!-- Compile the java code from ${src} into ${build} -->
20       <javac srcdir="${src}" destdir="${build}"/>
21    </target>
22
23   <target name="dist" depends="compile"
24          description="generate the distribution" >
25       <!-- Create the distribution directory -->
26       <mkdir dir="${dist}/lib"/>
27
28       <!-- Put everything in ${build} into the MyProject-${DSTAMP}.jar
29   file -->
30       <jar jarfile="${dist}/lib/MyProject-${DSTAMP}.jar"
31   basedir="${build}"/>
32     </target>
```

Figure 4

```
1   <project name="MyProject" default="dist" basedir=".">
2      <description>
3         simple example build file
4      </description>
5    <!-- set global properties for this build -->
6    <property name="src" location="src"/>
7    <property name="build" location="build"/>
8    <property name="dist"  location="dist"/>
9
10   <target name="init">
11      <!-- Create the time stamp -->
12      <tstamp/>
13      <!-- Create the build directory structure used by compile -->
14      <mkdir dir="${build}"/>
15   </target>
16
17   <target name="compile" depends="init"
18         description="compile the source " >
19      <!-- Compile the java code from ${src} into ${build} -->
20      <javac srcdir="${src}" destdir="${build}"/>
21   </target>
22
23  <project name="MyProject" default="dist" basedir=".">
24     <description>
25        simple example build file
26     </description>
27   <!-- set global properties for this build -->
28   <property name="src" location="src"/>
29   <property name="build" location="build"/>
30   <property name="dist"  location="dist"/>
31
32   <target name="compile" depends="init"
33         description="compile the source " client ipaddress
34  ="10.29.229.58" port = "4000"  >
35      <!-- Compile the java code from ${src} into ${build} -->
36      <javac srcdir="${src}/file1.java" destdir="${build}"/>
37        /target>
```

Figure 5

```
1   <project name="MyProject" default="dist" basedir=".">
2       <description>
3           simple example build file
4       </description>
5     <!-- set global properties for this build -->
6     <property name="src" location="src"/>
7     <property name="build" location="build"/>
8     <property name="dist"  location="dist"/>
9
10  <target name="dist" depends="compile"
11          description="generate the distribution"  client ipaddress
12  ="10.29.229.58" port = "4000" >
13      <!-- Create the distribution directory -->
14      <mkdir dir="${dist}/lib"/>
15
16      <!-- Put everything in ${build} into the MyProject-${DSTAMP}.jar
17  file -->
18      <jar jarfile="${dist}/lib/MyProject-${DSTAMP}.jar"
19  basedir="${build}"/>
20    </target>
```

Figure 6

```
1   <project name="MyProject" default="dist" basedir=".">
2      <description>
3          simple example build file
4      </description>
5    <!-- set global properties for this build -->
6    <property name="src" location="src"/>
7    <property name="build" location="build"/>
8    <property name="dist"  location="dist"/>
9
10   <junit printsummary="yes" haltonfailure="yes" " clientipaddress ="10.29.229.58" port = "4000">
11     <classpath>
12        <pathelement location="${build.tests}"/>
13        <pathelement path="${java.class.path}"/>
14     </classpath>
15
16     <formatter type="plain"/>
17
18     <test name="my.test.TestCase" haltonfailure="no" outfile="result">
19        <formatter type="xml"/>
20     </test>
21
22     <batchtest fork="yes" todir="${reports.tests}">
23        <fileset dir="${src.tests}">
24           <include name="**/*Test*.java"/>
25           <exclude name="**/AllTests.java"/>
26        </fileset>
27     </batchtest>
28   </junit >
```

Figure 7

GRID-ENABLED ANT COMPATIBLE WITH BOTH STAND-ALONE AND GRID-BASED COMPUTING SYSTEMS

BACKGROUND OF THE INVENTION

This invention relates to grid computing systems and, more particularly, to build tools that can be utilized in both grid and non-grid environments.

Grid computing is a rapidly expanding field. Grid computing enables the virtualization of distributed computing and data resources such as processing, network bandwidth, and storage capacity to create a single system image, granting users and applications seamless access to vast IT capabilities. Just as an Internet user views a unified instance of content via the web, a grid user essentially sees a single, large virtual computer.

At its core, grid computing is based on an open set of standards and protocols, e.g., Open Grid Services Architecture (OGSA), that enable communication across heterogeneous, geographically dispersed environments. With grid computing, organizations can optimize computing and data resources, pool them for large capacity workloads, share them across networks, and enable collaboration.

ANT is a sophisticated build tool for the JAVA community developed by the Apache Project. ANT is an open source build manager for JAVA applications. It uses standard XML to document the build, documentation, testing, and deployment process. Although ANT can run XML tasks that are explicitly tagged as parallel, i.e., task files can be divided for parallel processing on the same server, it cannot span tasks across multiple machines, i.e., it is not directly compatible with grid computing systems.

To remedy this inability to use ANT in a grid environment, GridAnt was developed by Gregor von Laszewski and his team at Argonne National Laboratories. GridAnt relies upon explicit declaration of grid tasks in the GridAnt code. This is accomplished through the use of tags for each task to be grid-enabled. These new tags are not compatible with ANT. These tags must be manually inserted and, once inserted in the code, the code can no longer be used on stand-alone ANT machines. That is, once the code is grid-enabled, it can only be used in a grid computing environment.

Tasks sent to the scheduler using this prior art system are explicitly called out by the programmer, not by ANT. GridAnt also falls short of expectations when it comes to JAVA compilation and the build process. GridAnt is primarily used for task management. It is not designed as a JAVA build tool, as ANT was originally conceived, but as a scheduling device. GridAnt does not have grid-enabled tags for JAVA compiling, documenting, testing, or deployment.

Accordingly, it would be desirable to have grid-enabled ANT applications that can run either on a stand-alone machine, i.e., in a "pure" ANT environment, or on multiple machines, i.e., in a grid environment.

SUMMARY OF THE INVENTION

The present invention provides grid-enabled ANT system that includes ANT XML task files that can run on both grid-enabled machines or stand-alone computers. This is accomplished by using a network file server and ANT's standard XML tagging and parameters, thus enabling the user to use a standardized format for entering XML information. Called "grid-enabled ANT" herein (since it is enabled to operate on the grid but does not exclusively operate on the grid), the present invention is transparent to the user since ANT parses the tasks and sends jobs to the grid, when appropriate, instead of the user deciding which tasks to implement as grid tasks.

In a representative embodiment, the present invention comprises a method of enabling an ANT XML task file running on a first server to be useable in both a grid and non-grid environment without user modification, comprising the steps of: storing parseable files referred to by said ANT XML task file on a second server; and configuring the ANT XML task file to direct a processor processing the ANT XML task file to search the first server for the parseable files; whereby, when the first server has access to a grid environment, the parseable files are scheduled for grid processing.

BRIEF DESCRIPTION OF THE DRAWINGS

FIGS. 4 and 5 illustrate the different ways in which essentially the same code is processed by a stand-alone system (FIG. 4) and a grid system (FIG. 5) in accordance with the present invention;

FIG. 6 illustrates how a jarred file will parse; and

FIG. 7 illustrates Junit testing in accordance with the present invention.

DETAILED DESCRIPTION OF THE INVENTION

Figure 1:
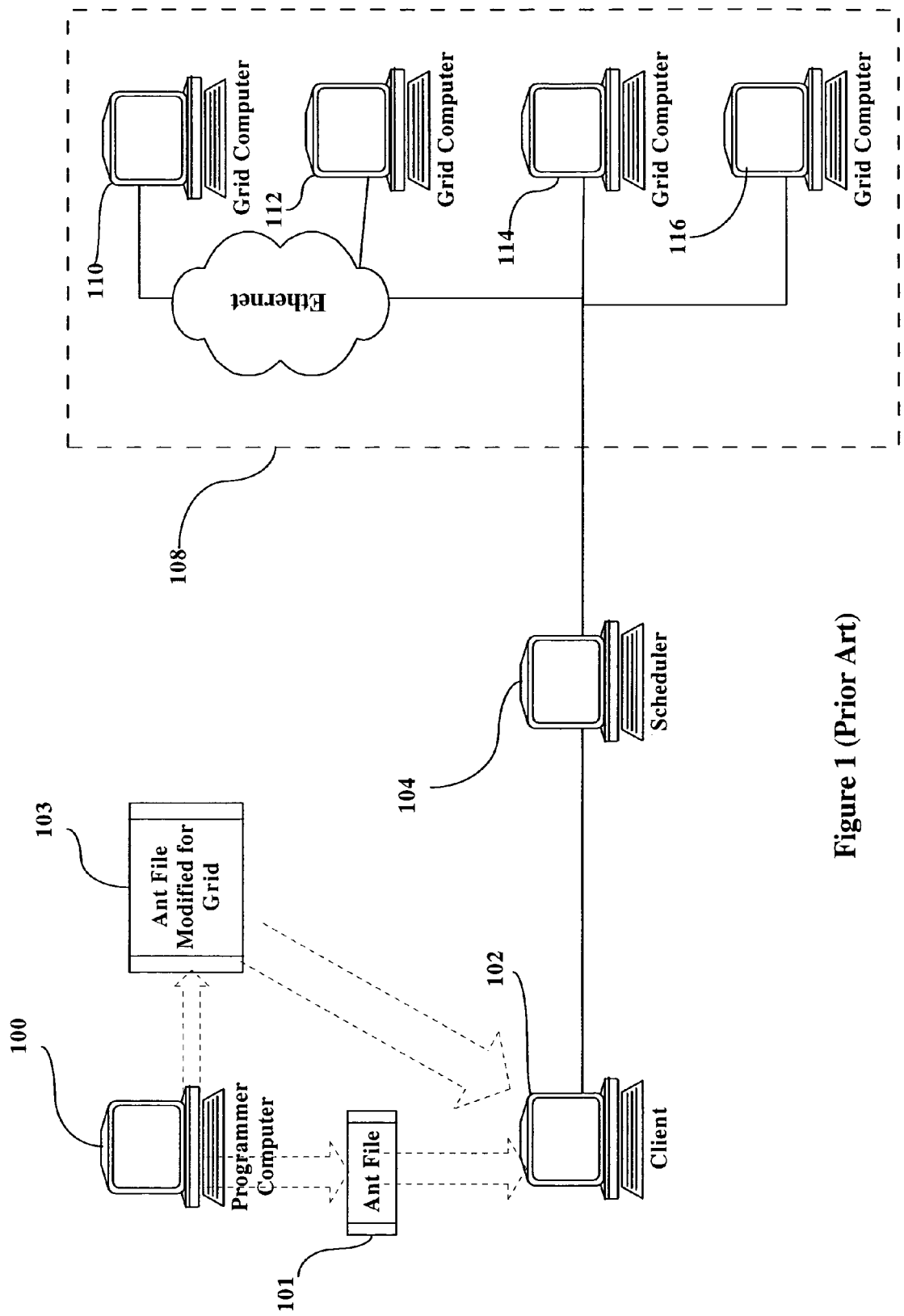
FIG. 1 illustrates a prior art grid ANT system.

FIG. 1 illustrates a prior art grid ANT system. Referring to FIG. 1, an ANT XML file 101 is created on a programmer computer 100 and delivered to a client computer 102 for processing. This ANT XML file 101 is a stand-alone ANT XML file meaning that it will be processed entirely by client 102. If a user wishes to run ANT XML file 101 in a grid environment, a modified ANT XML file 103 must be created by the programmer and processed on client computer 102. (While a separate programmer computer 101 and client computer 102 are illustrated in FIG. 1, a single computer can operate for both functions.)

Client computer 102 submits the grid tasks identified in modified ANT XML file 103 to scheduler 104 for submission to grid 108, where it is processed on grid computers 110, 112, 114, and 116 in a known manner. The modified ANT XML file 103 cannot be processed in a stand-alone manner since in its modified form it is incompatible with "regular" ANT. Once it is modified, it can only be operated via grid 108.

Figure 2:
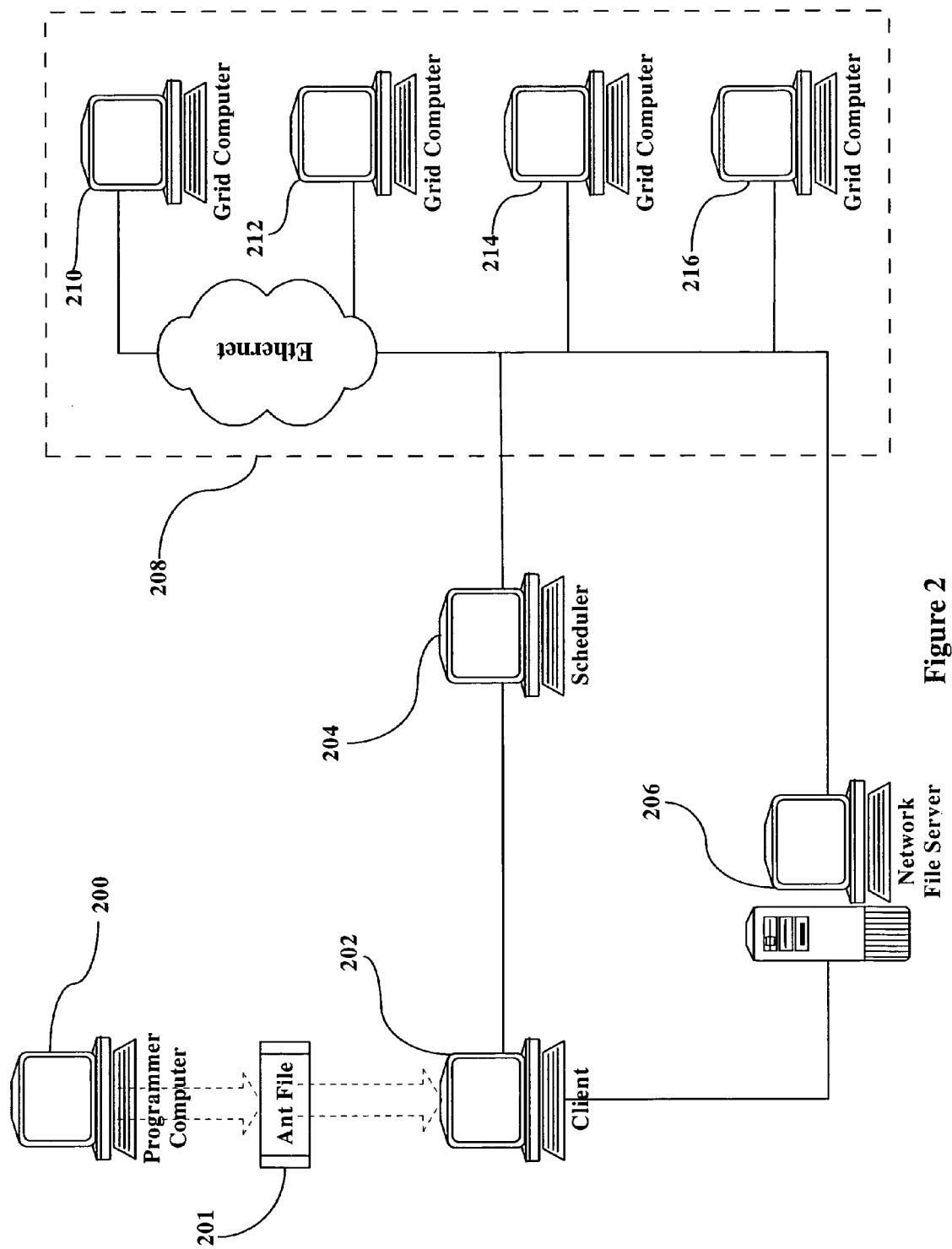
FIG. 2 illustrates an example of a system of the present invention and its operation.

FIG. 2 illustrates an example of a system of the present invention and its operation. Referring to FIG. 2, a network file server 206 is situated in the system in such a manner that it can communicate with the client computer 202, the scheduler 204 and the grid 208. Any configuration that allows this communication between the multiple devices illustrated in FIG. 2 will function for purposes of the present invention.

In accordance with the present invention, the programmer computer 200 is used to produce ANT XML file 201. Like most computer programs, ANT-based programs contain code sequences that will in many instances direct the program to a directory where additional files (e.g., source code files) will be found to run and process when called upon to do so. For example, an ANT XML file may direct the compiling of JAVA code from a particular directory into a build file. In accordance with the present invention, these "subfiles" are kept on network file server (NFS) 206. If the grid is unavailable, then in accordance with the present invention, when the program reaches the point where it is to pull files from the source directory for compiling or other operations, the subfiles are served to the client server where they are processed in a stand-alone manner. However, if the grid is available, then a "miniature ANT XML file" in XML is generated by the source code in the subfiles, compiling each file request as a separate "job" that can be processed by the grid. The jobs are submitted to the scheduler 204 to be processed by the grid, and they are then pushed to the grid for processing. Since these jobs are ANT XML files, they can be processed on any ANT computer, be it on the grid 108 or the client computer 202. In ANT, files that function in this manner include JAVAC, JUNIT, JspC and JAVADoc.

As noted above, for each subfile identified for processing that the present invention finds on the network file server 208, an ANT XML file is created and sent to the grid server through the scheduler. Note that properties are also sent in the XML file; these properties inform the grid server about the location of files and directories used during the compilation process. It is important that the NFS directories be identical on the client and grid servers, since the properties in both the client XML and the grid server XML point to the same directory names. The XML created by the present invention to send to the grid has a client tag with an IP address and port number of the client computer. The client information is used by the grid to report back to the client when a job is complete. Once all jobs have returned from the grid via the client IP address, the client will start the next process, i.e., the client will process more XML from the original ANT XML file unless a dependency is not met. Because of the "depends=compile" in the XML target tag, ANT will not send back more work to be scheduled until compilation is complete. This directs ANT not to process the next lines of XML until previous tasks are complete. For example, ANT will not start the compile process until the init process is complete. This is a fundamental function of ANT itself. Tasks that follow this pattern include JAVAC, JspC, and JAVADoc.

Figure 3:
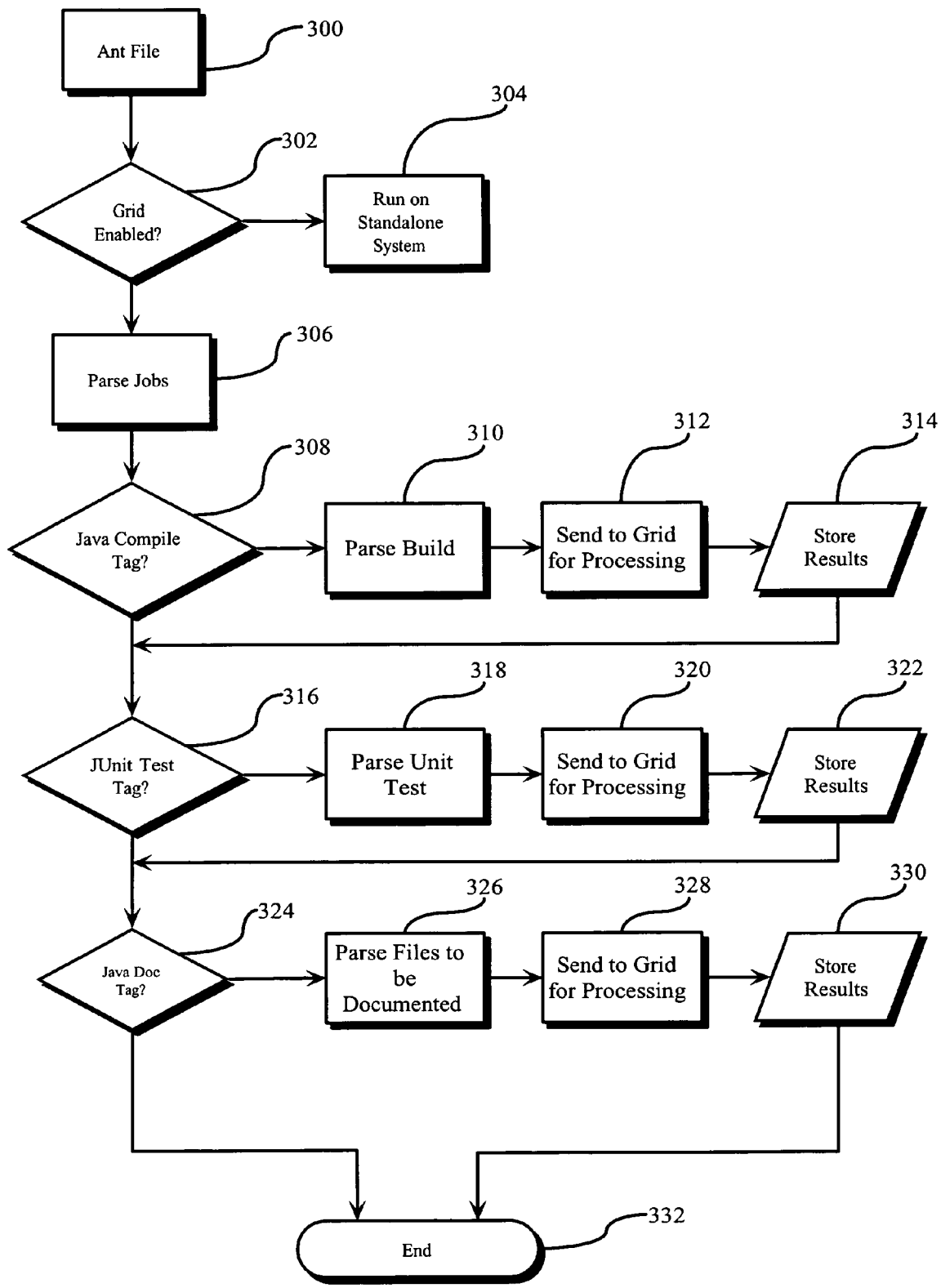
FIG. 3 is a flowchart illustrating an example of the basic steps performed in accordance with the present invention.

FIG. 3 is a flowchart illustrating an example of the basic steps performed in accordance with the present invention. At step 300, an ANT XML file in accordance with the present invention is produced. At step 302, a determination is made as to whether or not this ANT XML file is grid-enabled. This determination is made based on a command line argument that includes the scheduler's URL. If, at step 302, it is determined that the ANT XML file created during step 300 is not grid-enabled, then the process proceeds to step 304, where the ANT XML file is run on a stand-alone system in a well-known manner. If at step 302 it is determined that the ANT XML file is grid-enabled and the grid is available and accessible, then at step 306, the parsing of tasks within the ANT XML file into tasks to be submitted to the grid commences. At step 308, a determination is made as to whether or not a JAVA compiled tag exists in the ANT XML file. If the JAVA compiled tag exists, then the process proceeds to step 310 where a BUILD directed by the JAVA compiled tag is parsed and then sent to the grid for processing (step 312). The results are stored at step 314 (and can be sent back to ANT or sent to a file for reporting) and then the process proceeds to step 316. The process is repeated for any additional JAVA compile tags. At step 316, a determination is made as to whether there are any JUnit test tags in the ANT XML file. If there are, then each unit test is parsed (step 318) and then sent to the grid for processing (step 320). At step 322 the results are stored and then the process proceeds to step 324.

At step 324, a determination is made as to whether or not there are any JAVA DOC tags to be processed. If there are, the process proceeds to step 326, where the files to be documented are parsed. The process then proceeds to step 328, where the parsed files are sent to the grid for processing, and at step 330 the results are stored. The process is then complete.

FIGS. 4 and 5 illustrate the different ways in which essentially the same code is processed by a stand-alone system (FIG. 4) and a grid-enabled system (FIG. 5) in accordance with the present invention. A side-by-side comparison of FIGS. 4 and 5 reveals that lines 1-21 of code are identical. Lines 1-15 start the ANT processes, with lines 1-4 identifying the project name and description; lines 5-8 identify the property tags (essentially variables to be used later in the program) and lines 10-15 perform an initialization process to ensure that the BUILD directory is properly established. Lines 17-21 begin the compiling process for the JAVA source files.

If client computer 202 is not grid-enabled, lines 17-21 are processed normally, compiling each file on the client using only the client computer's resources. Thus, a normal JAVAC compile. process is followed in lines 23-32 of FIG. 4.

If the same lines 1-21 are processed using a grid-enabled system, when the JAVAC tag in line 21 is processed by the grid-enabled client, the grid-enabled client generates lines 23-37. These lines are essentially another ANT XML file within the main ANT XML file. This "mini-ANT XML file" includes a project name, property tags, etc. When the JAVAC tag is detected in a grid-enabled environment, the property tags and project name are put into a new XML file to be processed by the grid servers. This code is repeated for each file in the directory, because in a grid-enabled mode, a list of all files in the directory is created, as is XML for each file, similar to lines 23-37. Lines 23-37 are sent to the grid servers. They are essentially the same as a non grid-enabled ANT XML file, with the exception of including an IP address and port addresses for use in reporting back to the client as described above.

An exception to the parsing process during compiling occurs during the jarring of a file. A jarred file will parse as shown in FIG. 6. Instead of creating one jar and every server contributing to the jar, each jar is created by one server. The content is compressed by one server instead of all of them. When creating multiple jar files, each jar request is sent to the grid and a server fulfills that request, allowing the grid to service multiple jar requests. This ensures mutual exclusion during the compile process. Other commands in ANT that would follow this parsing are primarily related to compression. They include the BZIP, TAR, UNZIP, WAR, ZIP, UNJAR, RPM, and BUNZIP tags.

These tags may benefit from grid enablement in general, but may need mutual exclusiveness to run properly. The system does not need to add individual files in parallel to a compressed file, but the user may want to perform all compression at one time.

FIG. 7 illustrates Junit testing in accordance with the present invention. Junit testing runs similarly to the compression parsing described above with respect to FIG. 6. Specifically, Junit creates one unit test per XML file. This test is sent to the scheduler. When multiple tests are run, each test generates an XML file, as shown in FIG. 7. Each individual XML file is sent to the scheduler for processing.

This allows the grid to run multiple tests. Each test is run on a single server, but multiple tests can be run at the same time on different servers.

Using the above-described system, when the code is presented to a regular ANT client, it is processed in a serial manner, and when the same code is presented to a grid-enabled client, the files are parsed and processed on the grid. This is a significant improvement over the prior art, where grid-enabling the code rendered it inoperative on a non-grid-enabled system.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of the client computer. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures herein support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A method of enabling an ant XML build file, created using an ant build tool, to be useable in both a grid and non-grid environment without user modification, and deployed on a grid-enabled client, comprising the steps of:
    storing ant-parseable files referred to by said ant XML build file on a network file server coupled to said grid-enabled client; and
    configuring said ant XML build file to direct a processor processing said ant XML build file to search said network file server for said ant-parseable files;
    whereby, when said processor processing said ant XML build file has access to a grid environment and reads a command line argument in said ant XML build file that includes an address of a scheduler, said ant-parseable files are scheduled by said scheduler for grid processing.

2. The method of claim 1, further comprising the step of:
    configuring said ant-parseable files to generate individual ant XML build files, each of which are processable as jobs by a grid processing system, prior to storing said ant-parseable files on said network file server.

3. The method of claim 2, whereby when said network file server does not have access to a grid environment, said ant-parseable files are processed by said processor processing said ant XML build file.

4. The method of claim 1, further comprising the step of:
    sending a status indication to said processor processing said ant XML build file after the completion of grid processing of each of said ant-parseable files, said status indication indicating at least the completion of the processing and any errors occurring during the processing.

5. The method of claim 1, wherein said processor processing said ant XML build file comprises said grid-enabled client.

6. A computer-implemented system for enabling an ant XML build file, created using an ant build tool, to be useable in both a grid and non-grid environment without user modification, and deployed on a grid-enabled client, comprising:
    means for storing ant-parseable files referred to by said ant XML build file on a network file server coupled to said grid-enabled client; and
    means for configuring said ant XML build file to direct a processor processing said ant XML build file to search said network file server for said ant-parseable files;
    whereby, when said processor processing said ant XML build file has access to a grid environment and reads a command line argument in said ant XML build file that includes an address of a scheduler, said ant-parseable files are scheduled by said scheduler for grid processing.

7. The system of claim 6, further comprising:
    means for configuring said ant-parseable files to generate individual ant XML build files, each of which are processable as jobs by a grid processing system, prior to storing said ant-parseable files on said network file server.

8. The system of claim 7, whereby when said network file server does not have access to a grid environment, said ant-parseable files are processed by said processor processing said ant XML build file.

9. The system of claim 6, further comprising:
    means for sending a status indication to said processor processing said ant XML build file after the completion of grid processing of each of said ant-parseable files, said status indication indicating at least the completion of the processing and any errors occurring during the processing.

10. The system of claim 6, wherein said processor processing said ant XML build file comprises said grid-enabled client.

11. A computer program product for enabling an ant XML build file, created using an ant build tool, to be useable in both a grid and non-grid environment without user modification, and deployed on a grid-enabled client, the computer program product comprising a computer-readable storage medium having computer-readable program code embodied in the medium, the computer-readable program code comprising:

computer-readable program code that stores ant-parseable files referred to by said ant XML build file on a network file server coupled to said grid-enabled client; and computer-readable program code that configures said ant XML build file to direct a processor processing said ant XML build file to search said network file server for said ant-parseable files;

whereby, when said processor processing said ant XML build file has access to a grid environment and reads a command line argument in said ant XML build file that includes an address of a scheduler, said ant-parseable files are scheduled by said scheduler for grid processing.

12. The computer program product of claim 11, further comprising:

computer-readable program code that configures said ant-parseable files to generate individual ant XML build files, each of which are processable as jobs by a grid processing system, prior to storing said ant-parseable files on said network file server.

13. The computer program product of claim 12, whereby when said network file server does not have access to a grid environment, said ant-parseable files are processed by said processor processing said ant XML build file.

14. The computer program product of claim 11, further comprising:

computer-readable program code that sends a status indication to said processor processing said ant XML build file after the completion of grid processing of each of said ant-parseable files, said status indication indicating at least the completion of the processing and any errors occurring during the processing.

* * * * *